(12) United States Patent
Averbuch

(10) Patent No.: US 9,778,061 B2
(45) Date of Patent: Oct. 3, 2017

(54) ROAD DENSITY CALCULATION

(71) Applicant: HERE Global B.V., Veldhoven (NL)

(72) Inventor: Alex Averbuch, Buffalo Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/950,516

(22) Filed: Nov. 24, 2015

(65) Prior Publication Data

US 2017/0146360 A1 May 25, 2017

(51) Int. Cl.
*G01C 21/00* (2006.01)
*G01C 21/36* (2006.01)

(52) U.S. Cl.
CPC ..... *G01C 21/3679* (2013.01); *G01C 21/3667* (2013.01)

(58) Field of Classification Search
CPC combination set(s) only.
See application file for complete search history.

(56) References Cited

U.S. PATENT DOCUMENTS

| 6,560,531 | B1 | 5/2003 | Joshi | |
| 9,361,794 | B1 * | 6/2016 | Lynch | G08G 1/00 |
| 2004/0117107 | A1 * | 6/2004 | Lee | G08G 1/0104 |
| | | | | 701/117 |
| 2008/0300776 | A1 * | 12/2008 | Petrisor | G08G 1/0104 |
| | | | | 701/118 |
| 2009/0082997 | A1 | 3/2009 | Tokman et al. | |
| 2009/0138188 | A1 | 5/2009 | Kores et al. | |
| 2010/0076674 | A1 * | 3/2010 | Berot | G01C 21/3461 |
| | | | | 701/532 |
| 2013/0103294 | A1 * | 4/2013 | Koshizen | B60K 37/02 |
| | | | | 701/118 |
| 2013/0103295 | A1 * | 4/2013 | Koshizen | B60W 30/16 |
| | | | | 701/119 |
| 2013/0325317 | A1 * | 12/2013 | Pylappan | G01C 21/26 |
| | | | | 701/409 |

(Continued)

FOREIGN PATENT DOCUMENTS

| CN | 103150680 | 6/2013 |
| CN | 103281742 | 9/2013 |

(Continued)

OTHER PUBLICATIONS

Habermann et al., Vehicular Traffic as a Method to Evaluate Air Pollution on Large Cities, Sep. 27, 2010, SciElo.br.

(Continued)

*Primary Examiner* — Hussein A. Elchanti
(74) *Attorney, Agent, or Firm* — Lempia Summerfield Katz LLC

(57) ABSTRACT

A map region is analyzed by a mobile device or by a server. The map region including one or more road segments is identified. Multiple points are selected from the map region. From each of the selected points, a distance is measured from the selected point to a nearest road segment of the one or more road segments. A road density value is determined from the distances. The road density value may be based on an average of the distances. In one example, the road density value is an inverse of the average of the distances. The road density value may be a parameter for matching subsequent probe points to a road segment in the map region.

16 Claims, 14 Drawing Sheets

(56) References Cited

U.S. PATENT DOCUMENTS

| | | | | |
|---|---|---|---|---|
| 2014/0133347 A1* | 5/2014 | Han | ...................... | H04W 48/12 |
| | | | | 370/253 |
| 2015/0233718 A1* | 8/2015 | Grokop | ................ | G01C 21/165 |
| | | | | 701/501 |
| 2016/0161270 A1* | 6/2016 | Okumura | ............... | G01C 21/34 |
| | | | | 701/23 |

FOREIGN PATENT DOCUMENTS

| | | |
|---|---|---|
| CN | 103943025 | 7/2014 |
| JP | 2009300249 | 12/2009 |
| JP | 2011196895 | 10/2011 |

OTHER PUBLICATIONS

Quddus et al., Current Map-Matching Algorithms for Transport Applications: State-of-the Art and Furture Research Directions, 2007, Transportation Research Part C: Emerging Technologies.

White et al., Some Map Matching Algorithms for Personal Navigation Assistants, Sep. 19, 2000, Transportation Research Part C: Engineering Technologies 8.1.

* cited by examiner

ROAD DENSITY CALCULATION

FIELD

The following disclosure relates to a road density calculation, and more particularly, a road density calculation based on relative positions of roads in an area.

BACKGROUND

Service providers and device manufacturers (e.g., wireless devices, cellular devices, and computers) are continually challenged to deliver value and convenience to consumers by, for example, providing compelling network services. Many of these services rely on accurately determining the position of these consumers in order to match them to map data. However, positioning data is inaccurate due to errors caused by technical as well as environmental factors. Thus, map matching requires repositioning the inaccurate probe data in order to match it to the correct map features.

For services such as route navigation, the probe data point must be repositioned to the correct road segment. Map matching techniques are not equally successful in all areas. Some techniques are susceptible to errors and ambiguity because the physical surroundings of road segments are not taken into account. Accordingly, service provider and device manufacturers face significant technical challenges associated with mapping probe data points to road segments.

SUMMARY

In an embodiment, a map region including one or more road segments is identified, and a plurality of points in the map region are selected. A plurality of distances are measured has a length from each of the plurality of points to a nearest road segment of the one or more road segments. A road density value is calculated from the plurality of distances, and a map matching parameter is calculated from the road density value.

In another embodiment an apparatus includes at least one processor, and at least one memory including computer program code, the at least one memory and the computer program code configured to, with the at least one processor, cause the apparatus at least to identify a map region including one or more road segments, select a plurality of points in the map region, measure a plurality of distances, wherein each distance is a length from each of the plurality of points to a nearest road segment of the one or more road segments, and calculate a road density value from an average length of the plurality of distances.

In another embodiment, a non-transitory computer readable medium including instructions that when executed are operable to receive at least one probe point collected by a mobile device in a geographical area corresponding to a map region, apply a map matching algorithm using a map matching parameter, wherein the map matching parameter is proportional to an inverse of an average of distances from a plurality of randomly selected location points in the map region to a nearest road segment, identify a matched road segment from the map matching algorithm, and generate a navigation command or a driving command based on the matched road segment.

BRIEF DESCRIPTION OF THE DRAWINGS

Exemplary embodiments of the present invention are described herein with reference to the following drawings.

DETAILED DESCRIPTION

One measure of road density is a total length of roads in an area divided by the size of the area. For example, consider a square geographic area having a side of length 1 mile. A single road crosses the square in a direction perpendicular to the side of the square. The total length of the road is 1 mile, and the area is 1 square mile. Therefore, the road density in this example is 1 mile/mile$^2$ or 1 mile$^{-1}$. These types of road density calculations may be referred to as classic road density to basic road density.

Map matching is a technique for assigning a collection probe data point to a digital map. A probe data point is a geographic location determined by global positioning system (GPS) or another positioning system. In map matching, the probe data is compared to navigable areas of the digital map. The navigable areas may correspond to road segments, path segments, pedestrian segments, and/or parking areas. For example, the probe data point may be compared to the location of a near road segment. The comparison may depend on the road density in the area. For example, the probe data points may be compared only to road segments within a predetermined distance that is calculated based on the road density.

However, using any of these metrics for road density, no distinction is made based on how the roads are distributed in the area. Consider an example of one area having roads spaced far apart near opposite sides of the perimeter of the area and another area having the same roads clustered close to each other. In the first example, a particular probe point is at most half of the area width away from the closest road, and in the second example a particular probe point may be as far as the width of the area apart from the closest road. Map matching is much easier, or can be done with higher confidence, when the distribution of the roads is considered. The following embodiments provide a road density calculation that accounts for the varying distances between roads.

Figure 1:
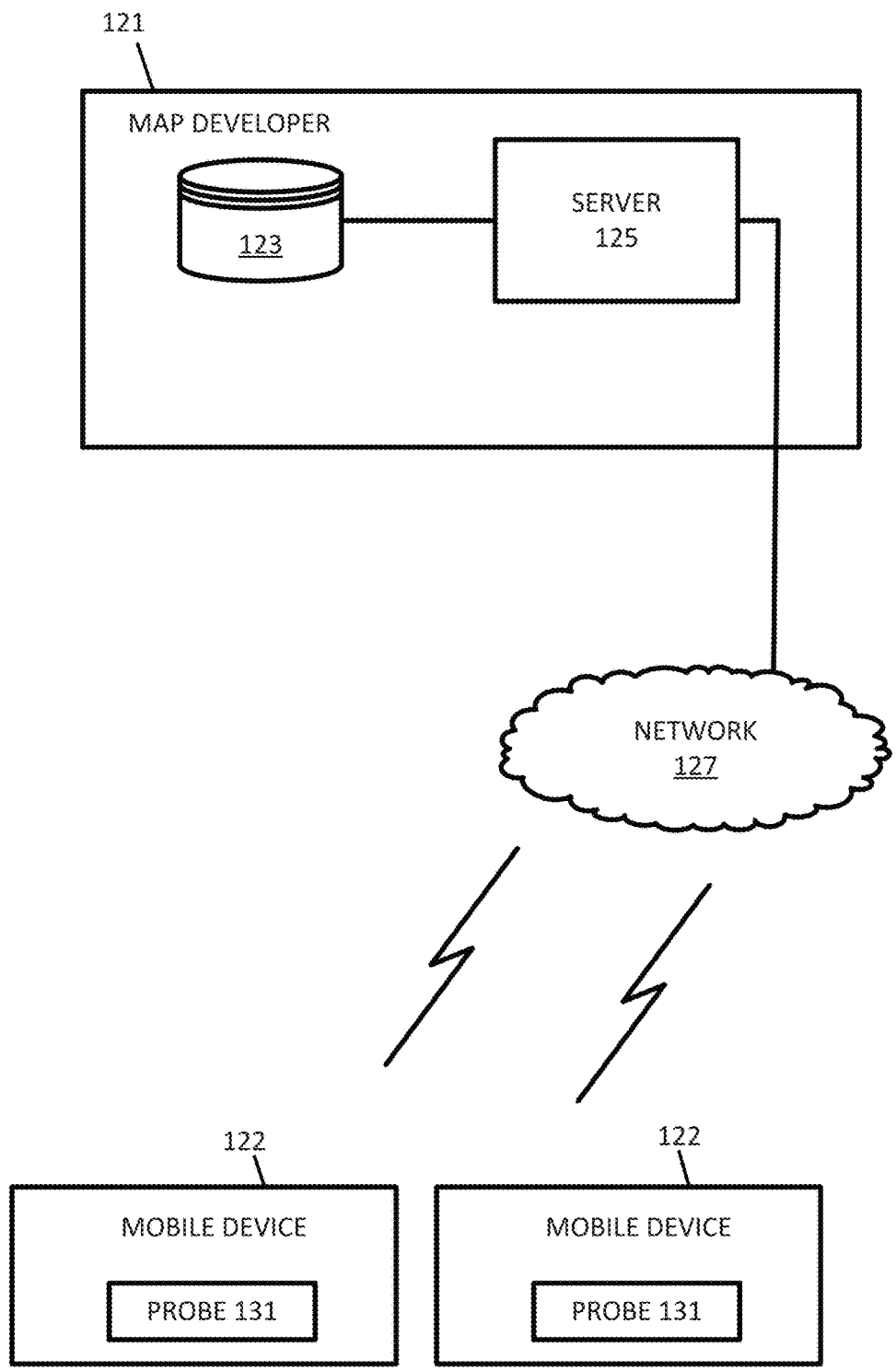
FIG. 1 illustrates an example system for calculating a distribution based road density.

FIG. 1 illustrates an example system for calculating a road density. In FIG. 1, one or more mobile device 122 include probes 131 and are connected to the server 125 though the network 127. A database 123 is also connected to the server 125. The database 123 and server 125 make up a developer system 121. A mobile device 122 is connected to the server 125 through the network 127. Additional, different, or fewer components may be included.

The server 125 may identify map data for a map tile or map region to analyze for determining a distribution based road density calculation from the average distance to the closest road segment. The map region may correspond to a political boundary such as a state, a city, a village, a township, or a neighborhood. The larger region may be divided into map tiles have a predetermined size (e.g., 10 square miles) or a predetermined number of degrees or portion of the earth's surface.

The map tile or map region may include data indicative of points of interest (POIs), street names, place names, parks, terrestrial features such as lakes and mountains, or other features. The server 125 may reduce the amount of map data for analysis by removed these features. As a result, the map data for the map tile or map region may include only road segments.

The server 125 may select one or more points in the map region. The selections may be made randomly. That is, each point in the map region may be assigned a first coordinate and a second coordinate (e.g., X, Y). The server 125 may use a random number generator, or a pseudorandom number generator, scaled between (minimum and maximum values) the possible values of X to select a random X value and scaled between (minimum and maximum values) the possible values of Y to select a random Y value. The server 125 combines the random X value and the random Y value to determine point. Thus, size of the map region is an example of a characteristic for selecting the random points.

In some examples, the map region is divided until multiple areas such as cells in a grid. The grid may be formed according to line of longitude and/or latitude. Each cell in the grid may be represented by a random point selected from the cell or a center point of the cell. The cells may also be labeled according to a coordinate system, such as letters along one dimension and numbers along another dimension (e.g., A1, B3).

The server 125 may calculate distances from each of the points to a nearest road segment. The distance may be a Euclidean distance calculated from a geographic location of the road segment to the geographic location of the point. In some examples, each road segment is represented by a single geographic location. In other examples, the road segments are lines. The distance from each of the points to the nearest road segment may be calculated by identifying a line from a selected point to the road segment. The server 125 may compare distances to nearby road segments and select the closest road segment. The server 125 may compare each of the road segments in the map region to the selected point.

In one example, when a line perpendicular to the road segment intersects the selected point, a length of the perpendicular line is the distance from the point to the road segment. When the line perpendicular to the road segment does not intersect the selected point, the distance from the selected point to the closest end of the road segment is used. In one example, the distance is Euclidean distance calculated from a square root of the sum of a square of a line extending the road segment and a square of a line perpendicular to the constructed line.

The server 125 calculates a road density value from the distances of the selected points. The number of selected points may be configured by the user. In one example, the number of selected points is constant (e.g., 10, 100, or a 1000). In another example, the number of selected points is determined based on the location of the map region. For example, one quantity of points may be used in metropolitan areas and another quantity of points may be used outside of metropolitan areas.

The server 125 calculates a map matching parameter from the road density value. The map matching value may be an inverse of the average shortest distance to the closest road segment. In map matching, a probe point or a series of probe points is matched to a road segment or a series of road segments. The probe point may be location data from GPS or a similar positioning device. When matching probe points all road segments greater than a threshold distance from a probe point may be dismissed or filtered. The threshold distance for eliminating road segments from the map matching process may be defined according to the map matching parameter. In one example, the threshold distance is equal to the map matching parameter.

The server 125 may store the map matching parameter and/or road density value in the database 123. The map tiles of the database 123 may include a data field for the map matching parameter or the road density value. Subsequently, the server 125 or another device may query the database 123 with a particular location or map tile identifier and receive in response the map matching parameter and/or road density value, which is then applied to the map matching algorithm.

The map matching parameter may be applied differently to road segments of different functional classes. For example, the map matching parameter may include a weight based on road functional class or be multiplied by a coefficient for functional classification. In one example, larger roads may be map matched using a larger radius than smaller roads. For example, the map matching parameter may be defined according to the number of lanes in the road segment.

Example classification systems that may be assigned numeric values for functional class. The functional class of the road segment may be described as a numerical value (e.g., 1, 2, 3, 4, and 5) represented in the feature vector. Functional class 1 may be highways while functional class 5 may be small streets. Table 1 further illustrates schemes having three to six functional classes.

One example of a simple system includes the functional classification maintained by the United States Federal Highway administration. The simple system includes arterial roads, collector roads, and local roads. The functional classifications of roads balance between accessibility and speed. An arterial road has low accessibility but is the fastest mode of travel between two points. Arterial roads are typically used for long distance travel. Collector roads connect arterial roads to local roads. Collector roads are more accessible and slower than arterial roads. Local roads are accessible to individual homes and business. Local roads are the most accessible and slowest type of road.

An example of a complex functional classification system is the urban classification system. Interstates include high speed and controlled access roads that span long distances. The arterial roads are divided into principle arteries and minor arteries according to size. The collector roads are divided into major collectors and minor collectors according to size. Another example functional classification system divides long distance roads by type of road or the entity in control of the highway. The functional classification system includes interstate expressways, federal highways, state highways, local highways, and local access roads. Another functional classification system uses the highway tag system in the Open Street Map (OSM) system. The functional classification includes motorways, trunk roads, primary roads, secondary roads, tertiary roads, and residential roads.

In addition or in the alternative, the map matching parameter may be adjusted based on a distance to a major metropolitan area from the road segment. For example, each map tile may be stored in associated with a proximity value indicative of the proximity of the road segment to the nearest metropolitan area. In one example, values from the coordinate system for the map tiles are associated with proximity values (e.g., {A1, 100} or {B3, 27}).

The mobile device 122 may be referred to as a probe. The probe 131 may be a positioning system (e.g., GPS) or a mobile application executed by the mobile device 122. The probe data may include at least a geographic location (e.g., two coordinates or three coordinates) and a timestamp from when the geographic location was collected or determined by the mobile device 122. The mobile device 122 may be running specialized applications that collect location data as people travel roads as part of their daily lives. Alternatively, the probe 131 may also be integrated in or with a vehicle.

The mobile device 122 may be a personal navigation device ("PND"), a portable navigation device, a mobile phone, a personal digital assistant ("PDA"), a watch, a tablet computer, a notebook computer, and/or any other known or later developed mobile device or personal computer. The mobile device 122 may also be an automobile head unit, infotainment system, and/or any other known or later developed automotive navigation system. Non-limiting embodiments of navigation devices may also include relational database service devices, mobile phone devices, car navigation devices, and navigation devices used for air or water travel.

The network 127 may include wired networks, wireless networks, or combinations thereof. The wireless network may be a cellular telephone network, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to TCP/IP based networking protocols.

The term server is used herein to collectively include the computing devices in a developer system 121 for creating, maintaining, accessing, and updating the map database 123. The server 125 may be a host for a website or web service such as a mapping service and/or a navigation service. The mapping service may provide maps generated from the geographic data of the database 123, and the navigation service may generate routing or other directions from the geographic data of the database 123. Additional, different, or fewer components may be included.

Figure 2:
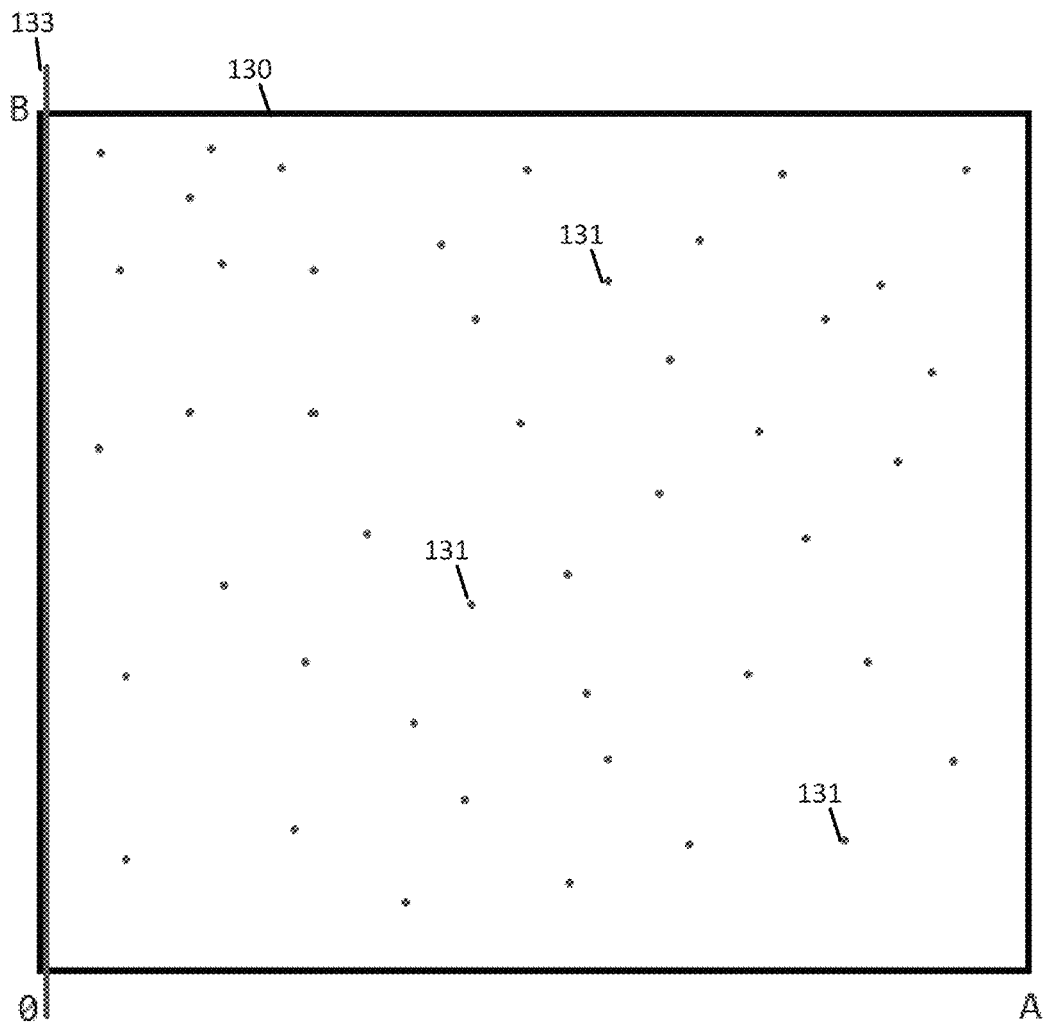
FIG. 2 illustrates an example map region.

FIG. 2 illustrates an example map region 130. One dimension of the map region 130 is of length A and the other dimension is length B. Thus, the total area of the map region 130 is A*B. A road 133 runs along one side the map region 130. Multiple points 131 are shown in the map region 130. A classical road density or basic road density may be the total road length in the map region divided by the total area: B/(A*B)=1/A. The embodiments herein describe a calculation for road density using a uniform distribution from 0 to A. Because the distribution is uniform, randomly selected points would be selected evenly from 0 to A. Thus, the average shortest distance from the points 131 to the road 133 is A/2. Accordingly, the inverse of the average shortest distance is 1/(average of the shortest distances to the roads) or 2/A, which may be a map matching parameter.

Figure 3:
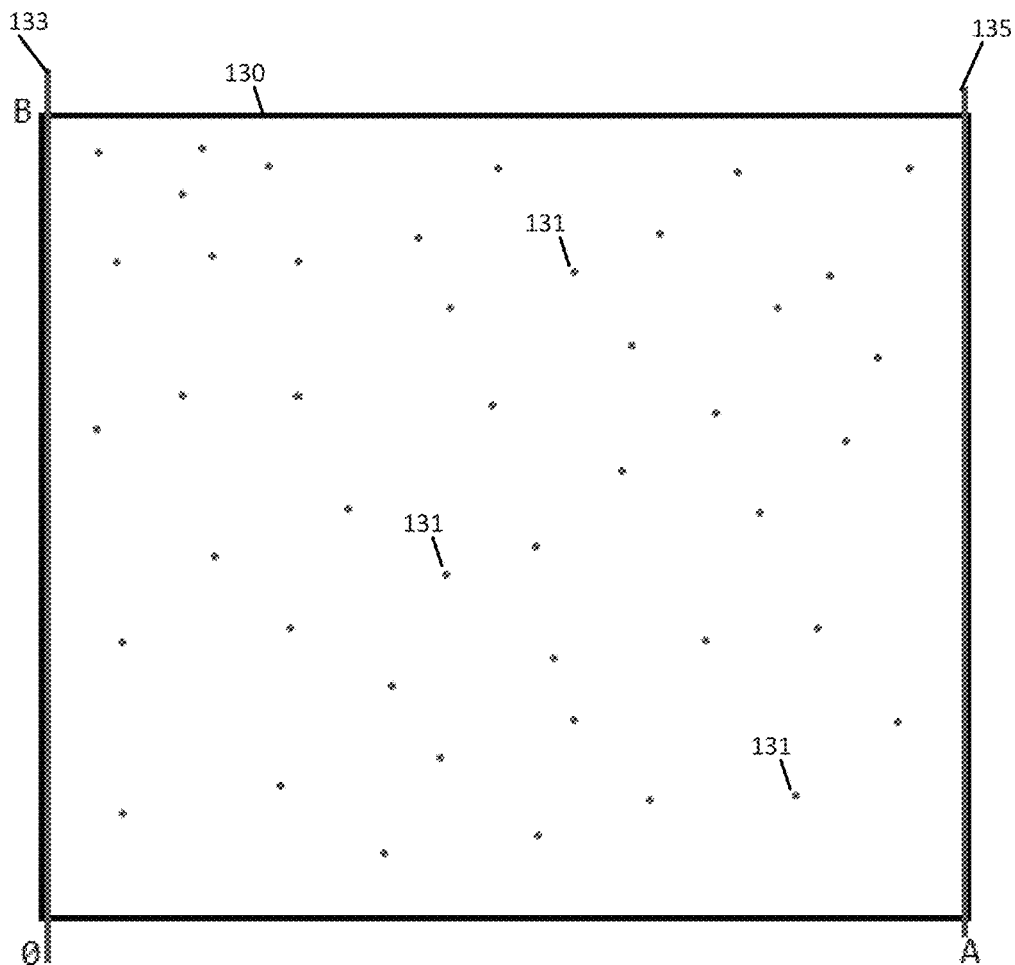
FIG. 3 illustrates another example map region.

FIG. 3 illustrates another example of map region 130. Again, the total map area map region 130 is A*B. A road 133 runs along one side the map region 130, and another road 135 runs along the other side of the map region 130. A classical road density may be the total road length in the map region divided by the total area: 2*B/(A*B)=2/A. Across the map region 130, there is a uniform distribution from 0 to A/2 of points 131. This is because exactly half of the points 131 of the map region 130 is closer to road 133 and the other half of the points 131 of the map region 130 is closer to road 135. Thus, the average shortest distance is A/4 and the inverse of the average shortest distance is 4/A, which may be a map matching parameter.

Figure 4:
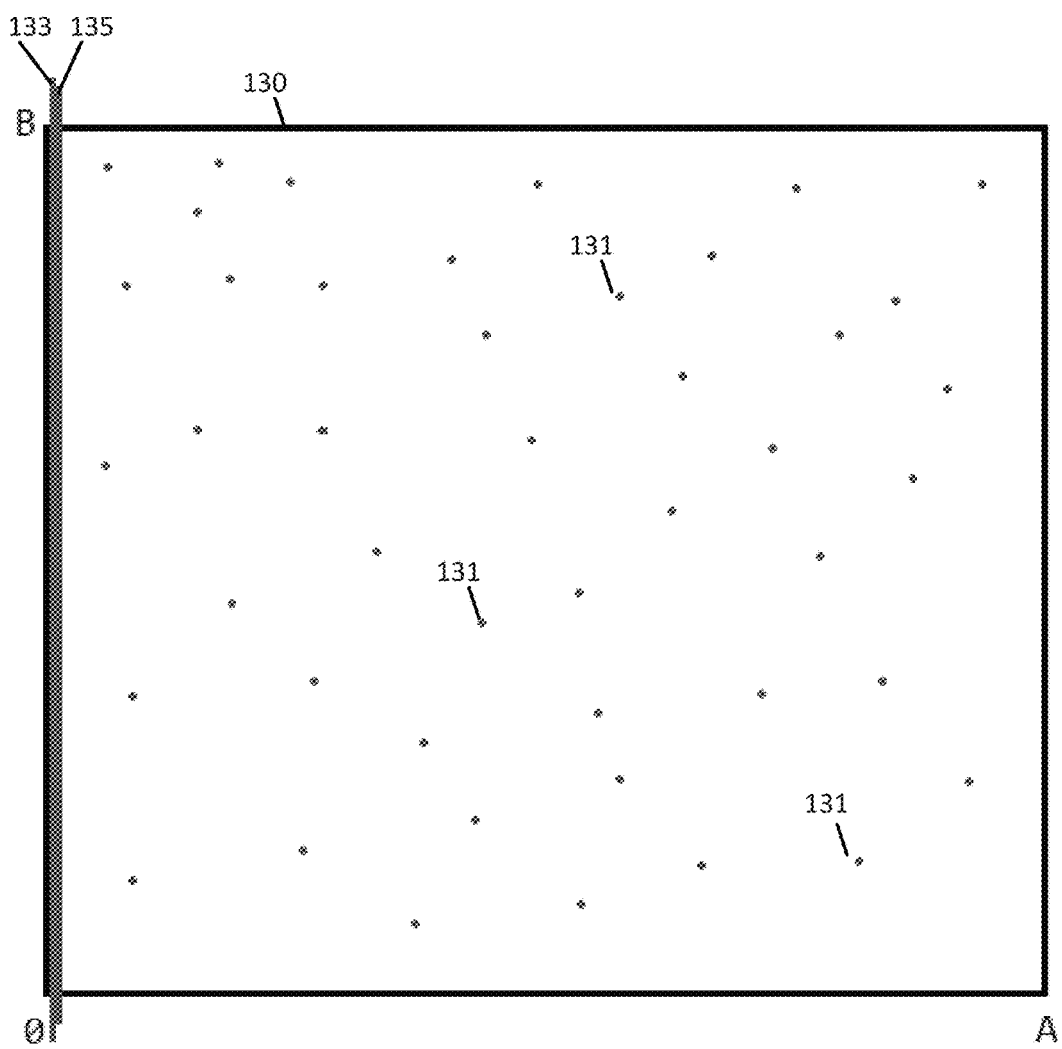
FIG. 4 illustrates another example map region.

FIG. 4 illustrates another example of map region 130. Again, the total map area map region 130 is A*B. A road 133 runs along one side the map region 130, and another road 135 runs along the same side of the map region 130. A classical road density may again be the total road length in the map region divided by the total area: 2*B/(A*B)=2/A. Because of the uniform distribution from 0 to A of any points selected in the map region 130, the average shortest distance from points 131 to a road is A/2, and an inverse of the shortest distance to a road is 2/A, which may be a map matching parameter.

Table 1 relates the examples of FIGS. 2-4 and an example in which three roads are clustered on a side of the map region. As shown in FIG. 3 or FIG. 4, when two roads cross the selected area either on the same side or different sides, the basic road density calculations give the same result. Because total length of the roads in the area is 2*B and total size of the area is A*B, classical road density is be 2/A. For purposes of map matching in FIG. 4, the points 131 on the right side of the area would be almost at distance A from any road, because both road 133 and road 135 are located in the left side of the area. So, the closest road segment for those points would be close to A. On the other hand, in FIG. 3 those points are close to road 135, because it is also located in the right side of the area. So, the farthest from any road segment points will be located somewhere close to the middle of the area, therefore, being not farther than A/2 from the closest road segment. So, FIGS. 3 and 4 being equivalent from the stand point of the basic road density are substantially different from the map matching stand point. The inverse of the average distance to the closest road segment is 2/A in FIG. 4 and 4/A in FIG. 3 because smaller distance to the closest road means that the roads are located more dense, so, the road density is higher.

TABLE 1

| | Basic Road Density | Distribution Based Road Density |
|---|---|---|
| FIG. 2 | 1/A | 2/A |
| FIG. 3 | 2/A | 4/A |
| FIG. 4 | 2/A | 2/A |
| Example of three road clustered on any side. | 3/A | 2/A |

Figure 5:
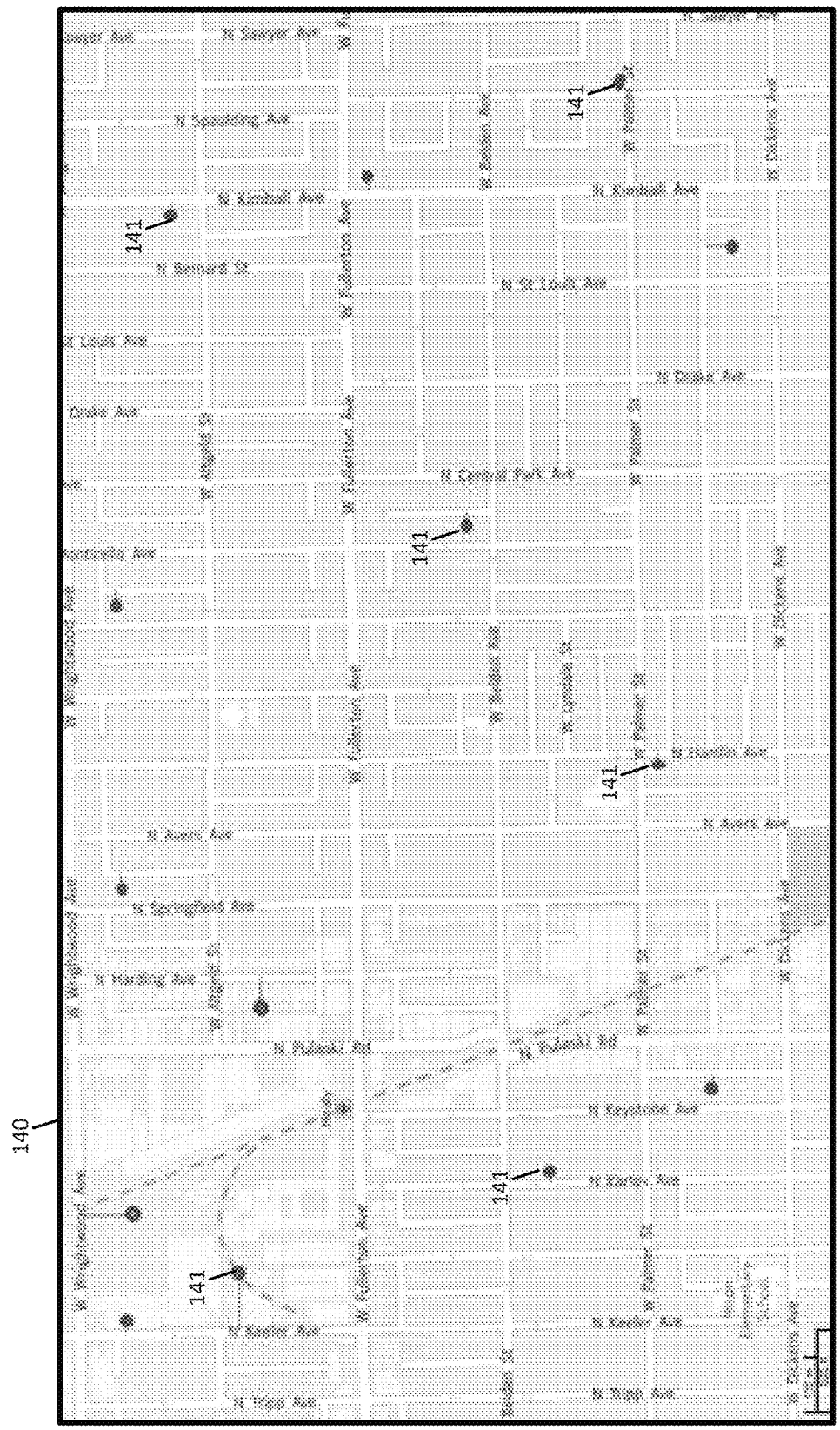
FIGS. 5 and 6 illustrate an example map region with randomly selected points.

FIG. 5 illustrates a map region 140 including multiple road segments and other road features. Random points 141 are selected within the map region 140. The map region 140 in FIG. 5 is an urban area, including a high density of road segments. The selected points may be selected randomly among the available points in the map region 140. Because of the high density of road segments, most or all of the random points 141 are close to the closest road segments. The average distance from each of the randomly selected points 141 may follow a distribution (e.g., Normal, Gaussian, or Poisson distribution) and the randomly selected points may be representative of the distribution. Depending on the size of the map region 140 and the variance in road density within the map region, a certain number of randomly selected points 141 in the map region 140 is sufficient to describe the map region 140. The certain number may be calculated by the standard deviation or variance of the distances over time and identifying a convergence level for the standard deviation or variance.

Figure 6:
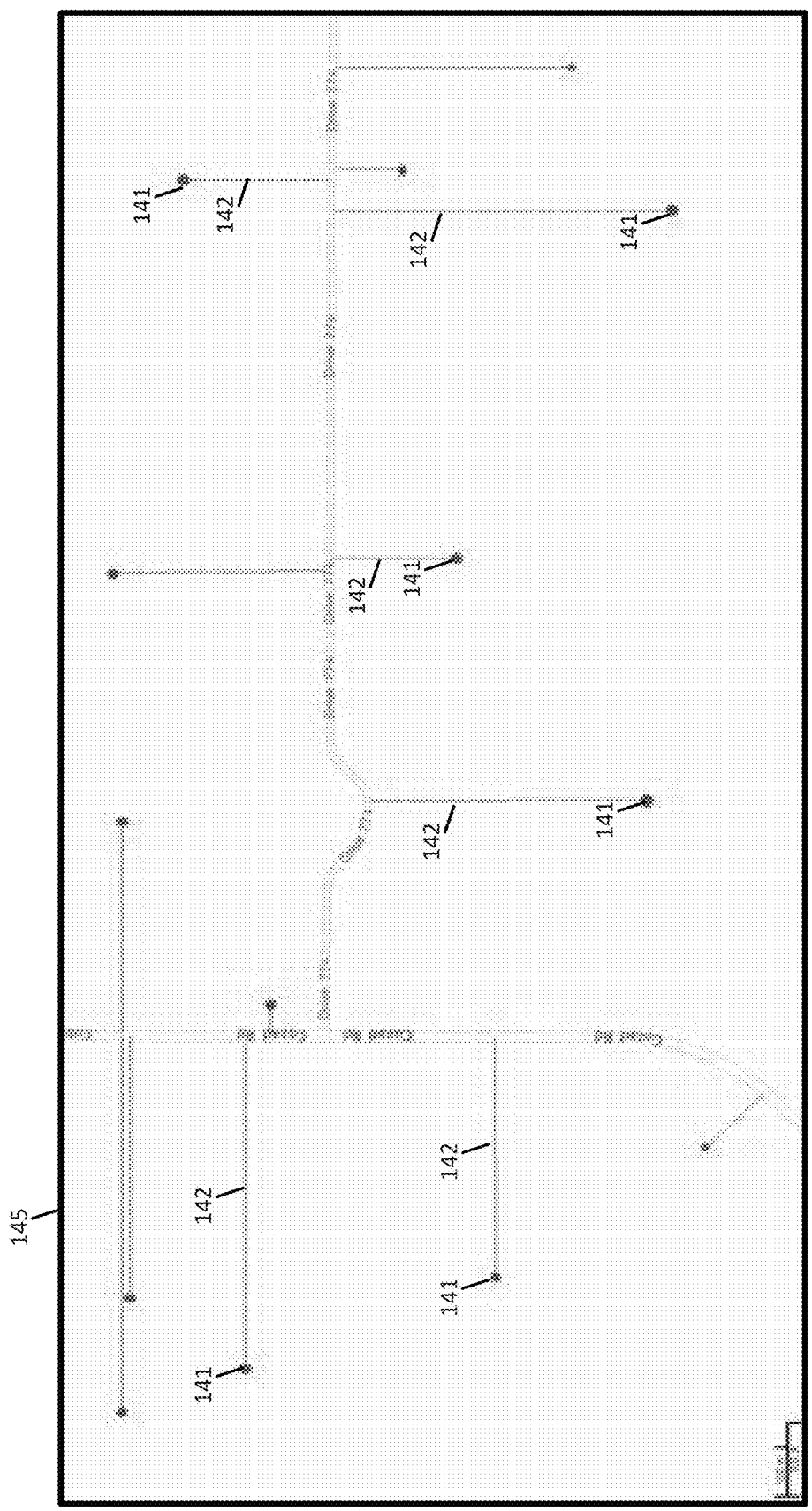

FIG. 6 illustrates that a line is drawn or calculated from each of the selected points 141 to the nearest road segment in map region 145. The map region 145 in FIG. 6 is a rural area, including a low density of road segments. Because of the low density of road segments, some of the random points 141 are spaced much farther from the closest road segments as compared to map region 140 in FIG. 5.

For either FIG. 5 or FIG. 6, the line to the nearest road segment may be perpendicular to the road segment and intersect one of the selected points 141. For the map area 140 or the map area 145 the distances of the lines are averaged. The average value, or the inverse of the average value, is the distribution based road density value.

Figure 7:
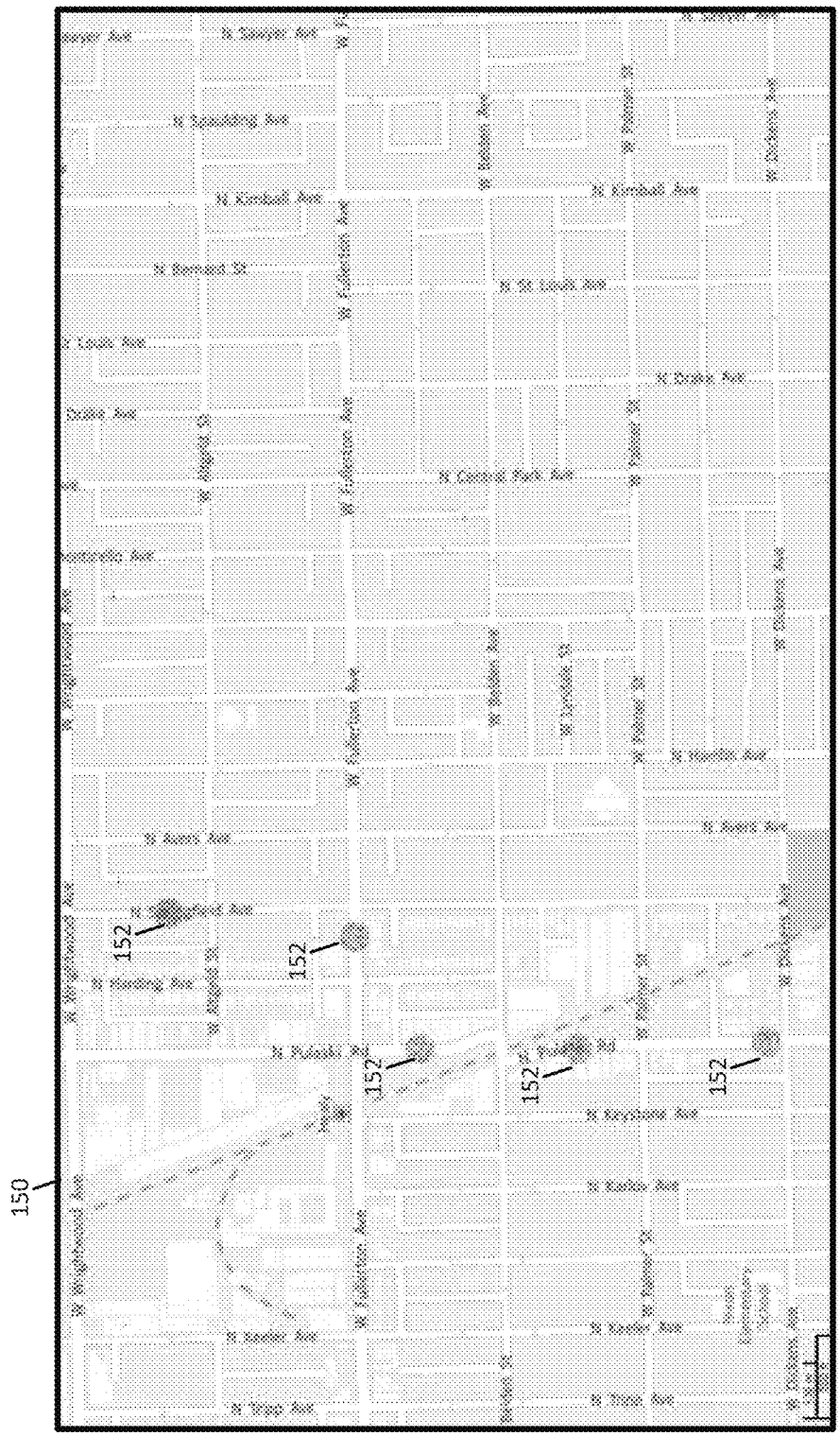
FIGS. 7-10 illustrate an example application of the distribution based road density value.
Figure 8:
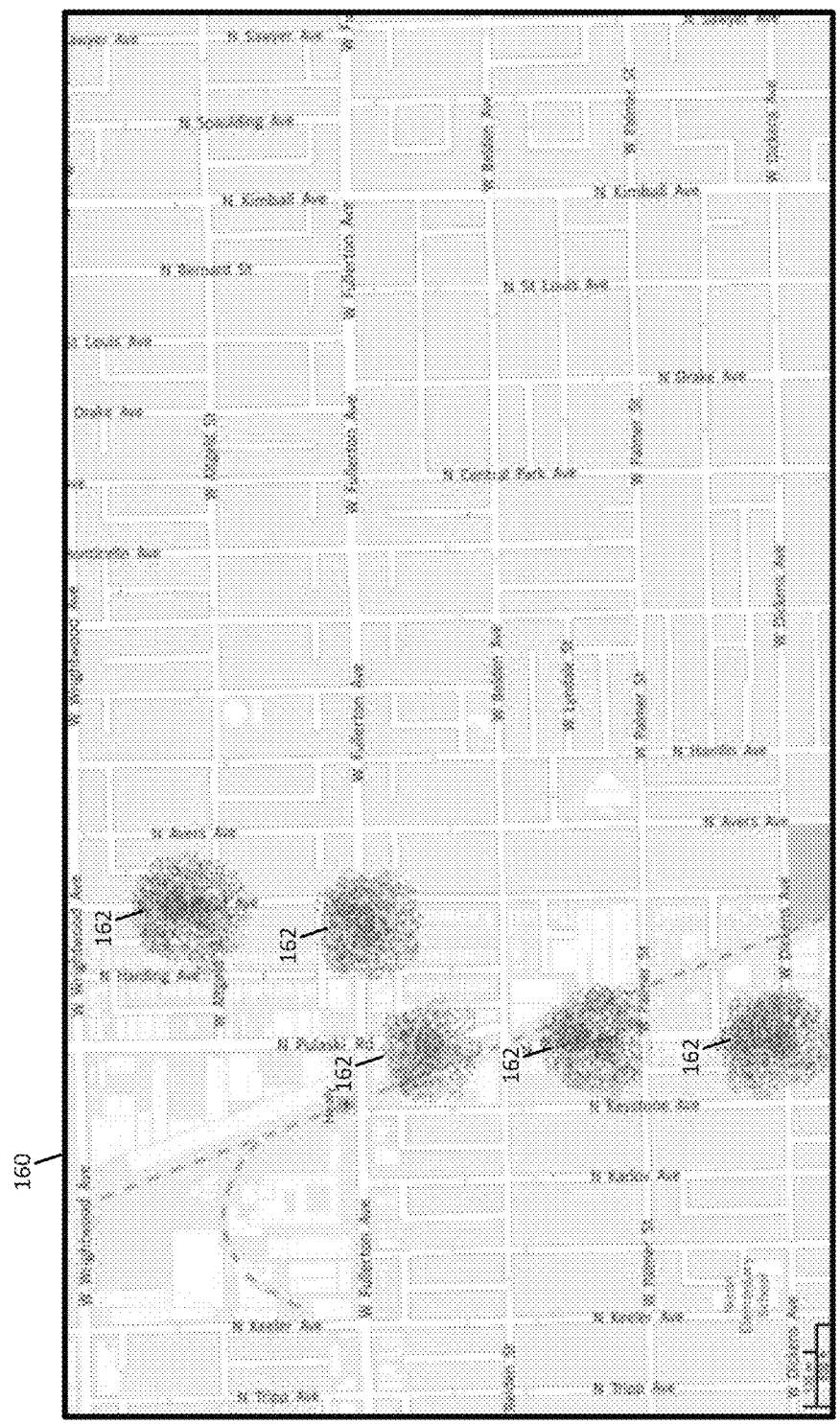
Figure 9:
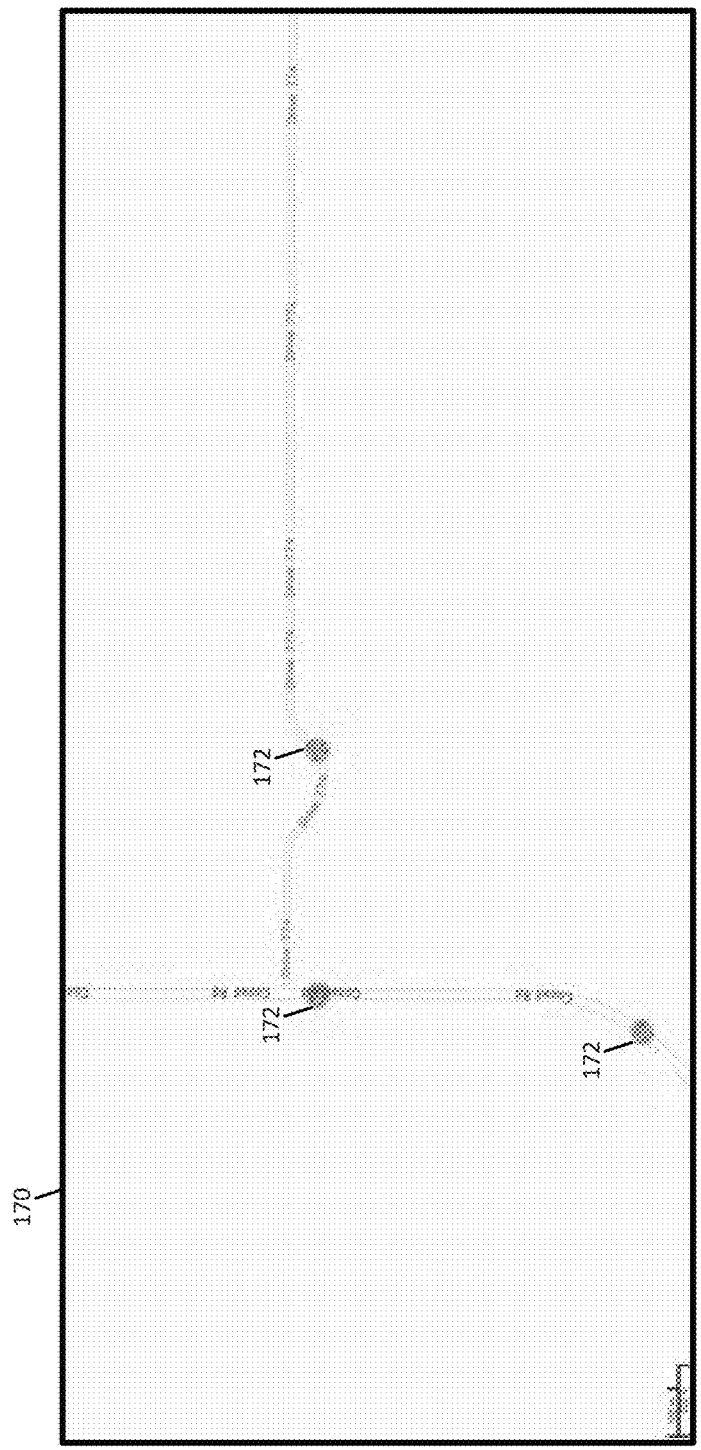
Figure 10:
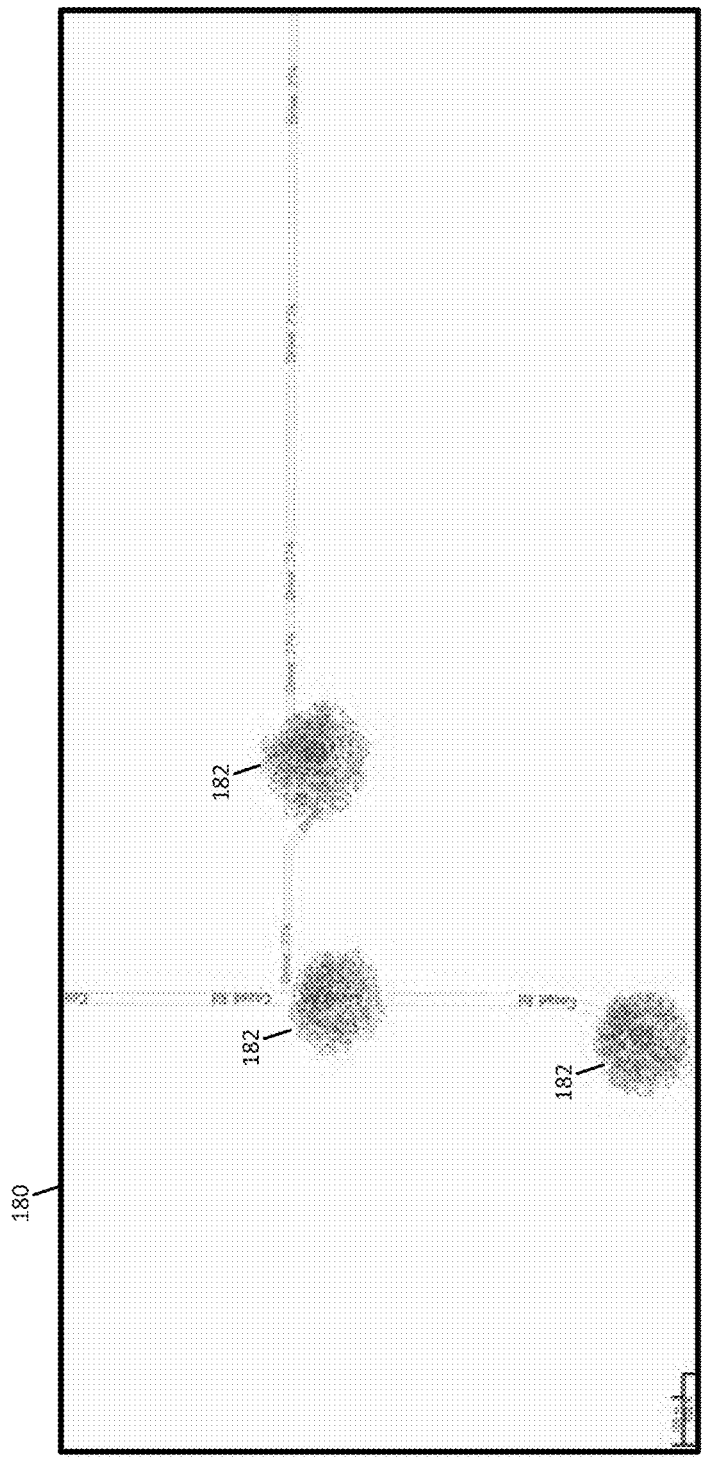

FIGS. 7-10 illustrate an example application of the distribution based road density value. FIGS. 7 and 8 illustrate collections of probe points in an urban area and FIGS. 9 and 10 illustrate collections of probe points in a rural area. In map region 150 of FIG. 7, map points or map point clusters 152 have been collected with a low level of uncertainty or variance. The level of uncertainty may be defined by how densely filled out the clusters 152 are. On other words, the average distances from any one point to any other point (or to the closest point) is relatively small. In FIG. 8, on the other hand, in map region 160, collections of map points or map point clusters 162 have been collected with a significant level of uncertainty. The level of uncertainty may be defined by how sparsely filled out the clusters 162 are. On other words, the average distances from any one point to any other point (or to the closest point) is relatively large.

Similarly, in FIG. 9 map region 170 includes map point clusters 172 that have been collected with a low level of uncertainty or variance, and in FIG. 10 map region 180 includes map clusters 182 that have been collected with a high level of uncertainty or variance.

The probe points making clusters 152 and 162 may be collected in a variety of techniques that cause the difference in variance. The accuracy of probe points collected by mobile phones may depend on the manufacturer, the software executed to collect the probe data, or the hardware of the positioning system. In addition, the accuracy of GPS may dependent on whether the data is collected in an urban area or a rural area. The urban area may be susceptible to electrical interference or noise or to reflection from object such as high buildings. The time differential caused by the reflection of GPS signals may be referred to as multipath signals because different signals from the satellite take different paths to the receiver (e.g., mobile device 122).

The administrator of the satellites for GPS (i.e., the government) may also artificially adjust the accuracy of location data it certain areas. Consequently, the cost of acquiring, aggregating, or organizing probe data may vary depending on the source of the probe data.

The probe data may be applied to a variety of applications. Traffic applications analyze probe data to determine the flow or speed of traffic on particular roads. Routing applications similarly may select a route based on recent probe data. Mapping applications may identify new roads, moved roads, or closed roads based on the probe data. Automated driving applications may provide driving functions or warning functions based on probe data. Each application for probe data may have a minimum variance level or a preferred minimum variance level in the probe that necessary for that application to run smoothly or as intended. For example, automated driving applications may have a high threshold (i.e., require a low variance in the probe data) and traffic applications may have a low threshold (i.e., require only a high variance in the probe data).

Some entities may collect, aggregate, and organize probe data for sale to other parties (e.g., map developer 121). The suitability or applicability of probe data to various applications may be dependent on the variance in the probe data.

Consequently, the demand for a particular type of probe data may depend on the variance or accuracy of the probe data.

An entity (e.g., map developer 121) may analyze a particular application to determine the type of probe data suitable for the application. For example, a map matching application performed on a rural area (e.g., FIGS. 9 and 10) may utilize less accurate detail. For rural settings, the probe data 172 (high accuracy) may be more expensive but not provide any create confidence in the map matching application than probe data 182 (low accuracy). The need for accurate probe data may be related to the distribution based map matching value. Thus, the server 125 may determine a threshold for the variance of the probe data based on the map matching value. The server 125 may select a set of probe data according to a comparison of the threshold to the variance of the probe data.

Figure 11:
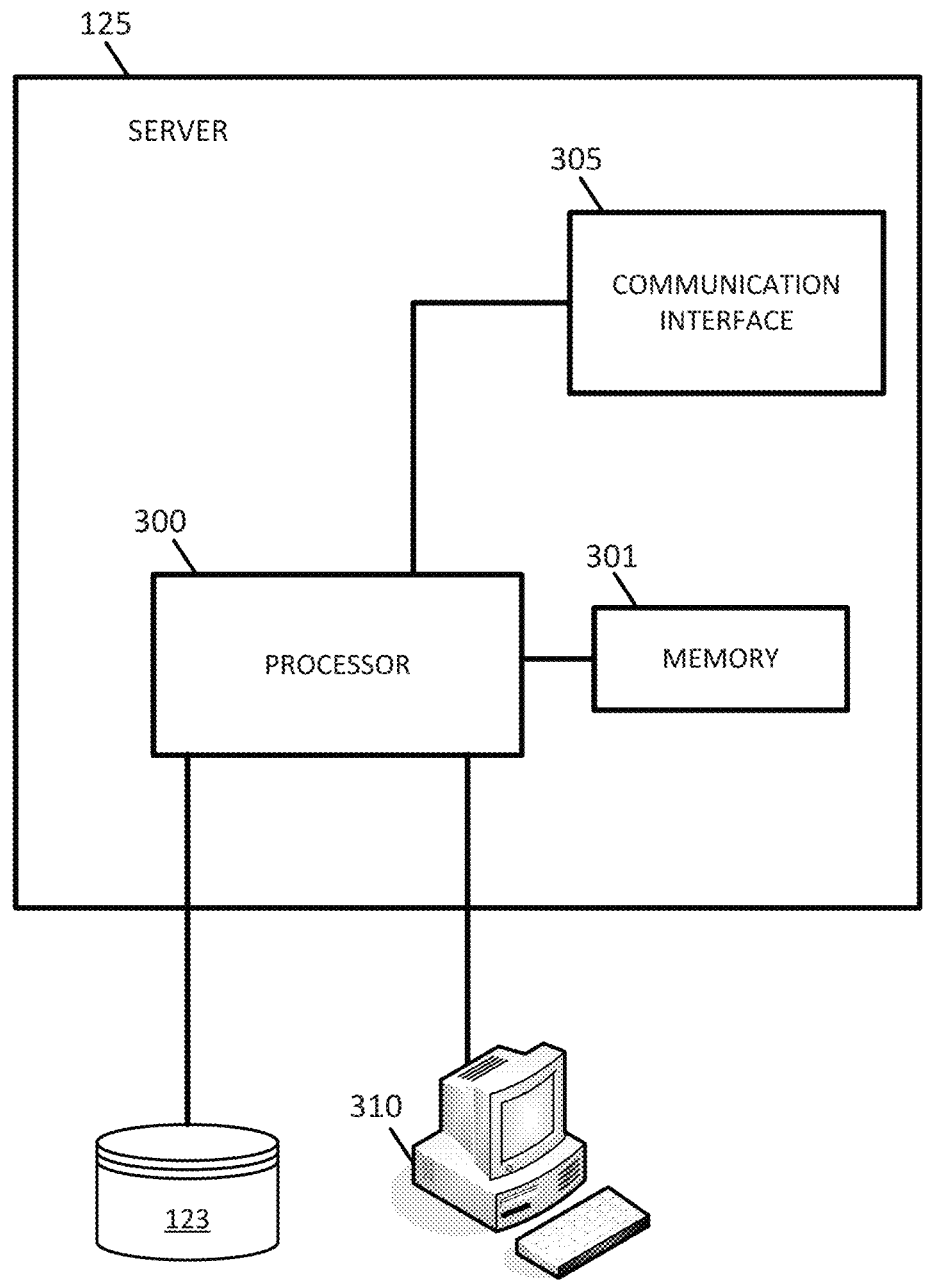
FIG. 11 illustrates an example server.
Figure 12:
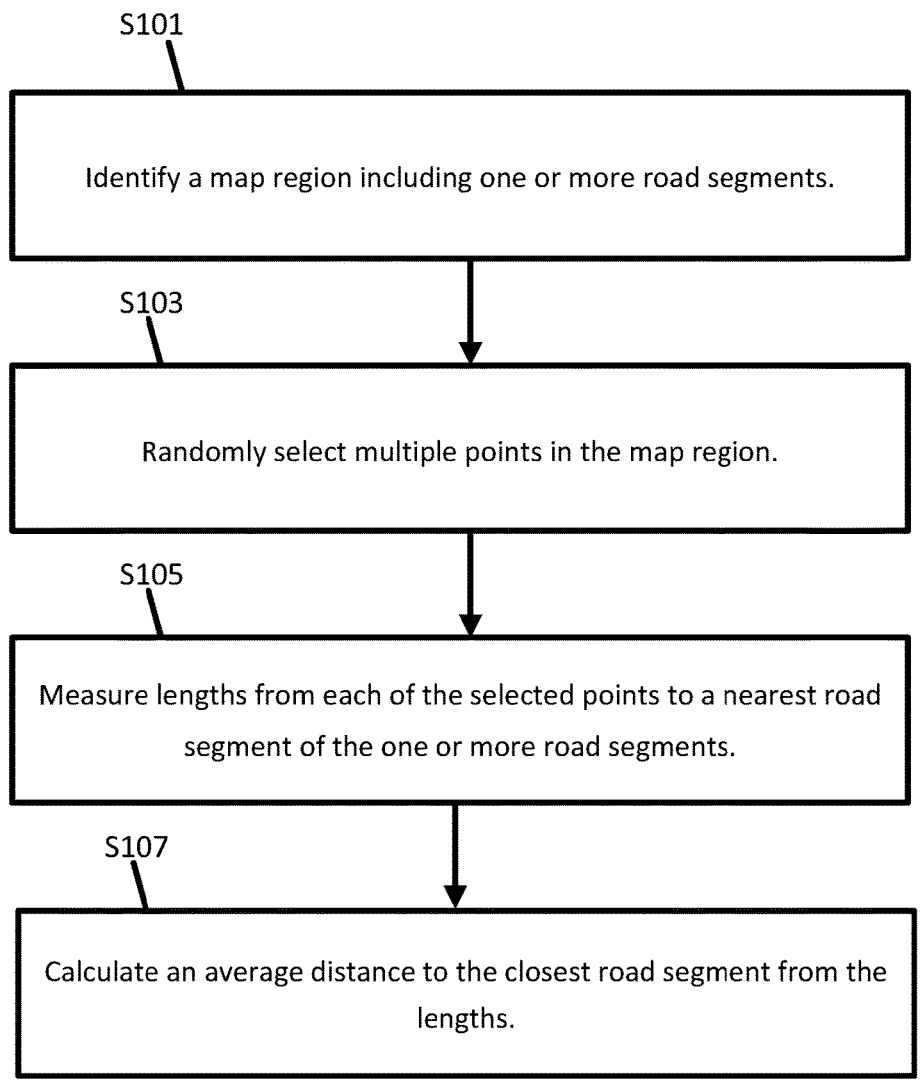
FIG. 12 illustrates an example flowchart for a distribution based road density calculation using the server of FIG. 11.

FIG. 11 illustrates an example server 125. The server 125 includes a processor 300, a communication interface 305, and a memory 301. The server 125 may be coupled to a database 123 and a workstation 310. The workstation 310 may be used to enter data regarding the threshold for selecting probe data. The database 123 may include the map data describing the map regions as well as the road segments. Additional, different, or fewer components may be provided in the server 125. FIG. 12 illustrates an example flowchart for the operation of server 125. Additional, different, or fewer acts may be provided.

In act S101, the processor 300 may identify a map region including one or more road segments. The map regions may be systematically identified by a moving window that is iteratively moved along the entire map. The map regions may have a predetermined size or a size of each map region may be set by the user using workstation 310.

In act S103, the processor 300 selects multiple points in the map region. The points may be selected randomly by the processor 300. For example, a random number may correspond to each of two coordinates each point. The random numbers may be selected using a random number generator. In one alternative, all of the points are selected. In another example, equidistantly spaced points are selected (e.g., a point every 100 meters or every mile) in two or three directions.

In act S105, the processor 300 measures lengths from each of the selected points to a nearest road segment of the one or more road segments. The distance may be measured in a real world distance based on the geography corresponding to the map region. The distance may be measured according to a relative coordinate system for the database 123. The distance may be measured according to the size of the image of the map region. In one example, the distances are distances from the selected point to a particular type of road segment. The particular type of road segment may be based on functional classification of a predetermined level or range. For example, in act S105, the processor 300 may determine distances from the selected road segments to the nearest freeway, distances from the selected road segments to the nearest arterial road, or distances from the selected road segments to the nearest collector road.

In act S107, the processor 300 calculate the average distance to the closest road segment from the distances. In one example, the density score is proportional from the average distances of the selected points to the nearest road segment. In another example, the density score is proportional to the inverse of the average distances of the selected points to the nearest road segment. The density score may be modified based on the selected number of points. For example, the density score may be modified according to a confidence interval that the selected points adequately represent the map region. Thus, the density score may be is indicative of a relative distance between road segments and a confidence in the accuracy of the relative distance. In one example, the processor 300 stores the density score and a confidence level in memory 301 or database 123 associated with a particular geographic location or map tile.

The communication interface 305 may subsequently receive probe data, and the processor 300 may analyze the probe data based on the density score. For example, the processor 300 may apply a map matching algorithm using the density score in order to identify a road segment. The map matching algorithm may assign a probe point to a digital map. The probe point may be a location data point collected by the mobile device 122 as determined by GPS or another positioning system. The probe data point may be two-dimensional (e.g., {X, Y} or longitude and latitude) or three-dimensional (e.g., {X, Y, Z} or longitude, latitude, and altitude). In map matching, the probe data is compared to path segments or other navigable areas of the digital map.

In one example, the map matching algorithm matches the probe point to a nearest road segment. In another example, a series of probe points are matched to a road segment or a series of road segments. For example, the probe points may be collected as the mobile device travels along the road. Some of the probe points may include location data that is directly overlapping the road segment, other probe points may be spaced apart on one side of the road segment, and still other probe points may be spaced apart on the other side of the road segment. The map matching algorithm may match the road segment to the series of probe points using a curve fitting or a least squares minimization technique.

Figure 13:
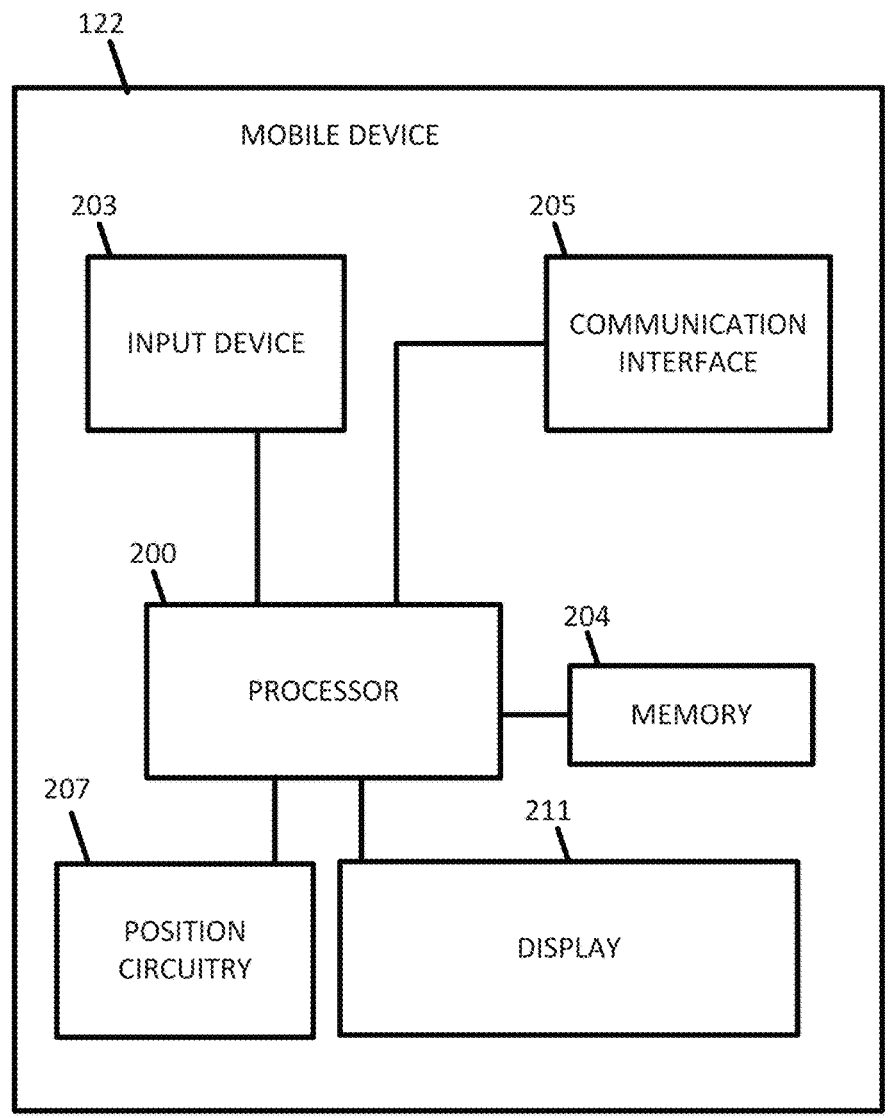
FIG. 13 illustrates an example mobile device.
Figure 14:
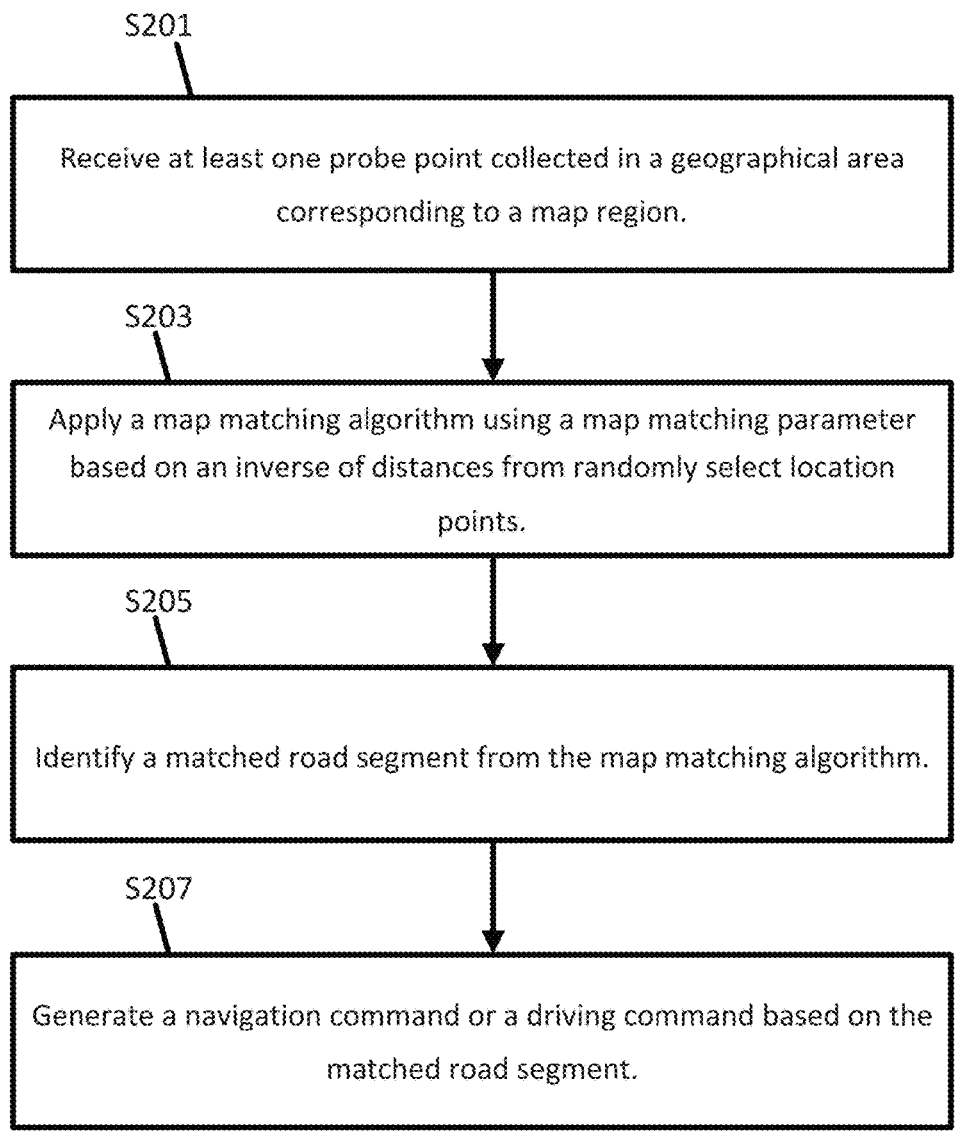
FIG. 14 illustrates an example flowchart for applying a distribution based road density using the mobile device of FIG. 13.

FIG. 13 illustrates an exemplary mobile device 122 of the system of FIG. 1. The mobile device 122 includes a processor 200, a memory 204, an input device 203, a communication interface 205, position circuitry 207, and a display 211. Additional, different, or fewer components are possible for the mobile device 122. FIG. 14 illustrates an example flowchart for the operation of the mobile device 122. Additional, different, or fewer acts may be used.

In act S201 the processor 200 or the communication interface 205 receives at least one probe point collected in a geographical area corresponding to a map region. The probe point may include location data generated by the position circuitry 207. The probe points may be collected at a specific time interval (e.g., once a minute, once a second, or another value). The probe points may be collected in response to a mobile application executed by the processor. The mobile application may be a map or navigation application. Alternatively, the mobile application may run in the background of the mobile device 122 and not be revealed to the user.

At act S203, the processor 200 applies a map matching algorithm using a map matching parameter. The map matching parameter may be calculated by processor 200 or previously by the same or another device. For example, referring back to FIG. 1, the server 125 may calculate the map matching parameter and send the map matching parameter to the mobile device 122 through network 127. The map matching parameter may be stored as an attribute to a road segment or map tile in database 123. The processor 200 may query the database 123 using the detected location data and receive the corresponding map matching parameter. The map matching parameter may be proportional to an inverse of an average of distances from randomly selected location points in the map region to a nearest road segment.

At act S205, the processor 200 is configured to identify a matched road segment from the map matching algorithm. The map matching algorithm may attempt to match road segments the probe data that is within a threshold radius set by the map matching parameter.

At act S207, the processor generates a traffic warning message, a navigation command or a driving command based on the matched road segment. The driving command may be a driving assistance command. Assisted driving vehicles include autonomous vehicles, highly assisted driving (HAD), and advanced driving assistance systems (ADAS). Any of these assisted driving systems may be incorporated into mobile device 122. Alternatively, an assisted driving device may be included in the vehicle. The assisted driving device may include memory, a processor, and systems to communicate with the mobile device 122.

The term autonomous vehicle may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the traffic estimation level of a current or upcoming road link based on the map matching for a current road link from the map matching parameter.

A highly assisted driving (HAD) vehicle may refer to a vehicle that does not completely replace the human operator. Instead, in a highly assisted driving mode, the vehicle may perform some driving functions and the human operator may perform some driving functions. Vehicles may also be driven in a manual mode in which the human operator exercises a degree of control over the movement of the vehicle. The vehicles may also include a completely driverless mode. Other levels of automation are possible. The HAD vehicle may control the vehicle through steering or braking in response to the traffic estimation level of a current or upcoming road link based on the map matching for a current road link from the map matching parameter.

Similarly, ADAS vehicles include one or more partially automated systems in which the vehicle alerts the driver. The features are designed to avoid collisions automatically. Features may include adaptive cruise control, automate braking, or steering adjustments to keep the driver in the correct lane. ADAS vehicles may issue warnings for the driver based on the traffic estimation level of a current or upcoming road link based on the map matching for a current road link from the map matching parameter.

The navigation command may be a routing instruction. The server 125 through the network 127 may be in contact with a mobile device 122. The mobile device 122 may be configured to execute routing algorithms to determine an optimum route to travel along a road network from an origin location to a destination location in a geographic region. Using input(s) including map matching values from the server 125, a mobile device 122 examines potential routes between the origin location and the destination location to determine the optimum route. The navigation device 122 may then provide the end user with information about the optimum route in the form of guidance that identifies the maneuvers required to be taken by the end user to travel from the origin to the destination location. Some mobile device 122 show detailed maps on displays outlining the route, the types of maneuvers to be taken at various locations along the route, locations of certain types of features, and so on.

The mobile device 122 may plan a route through a road system, or modify a current route through a road system based on the matched probe data. The route may extend from a current position of the mobile device or an origin to a destination through the road segment matched with the probe data. Possible routes may be calculated based on a Dijkstra method, an A-star algorithm or search, and/or other route exploration or calculation algorithms that may be modified to take into consideration assigned cost values of the underlying road segments. Various other aspects, such as distance, non-navigable areas, and/or restrictions, may be considered in addition to the cost to determine an optimum route.

One example cost for a road segment in calculating the route is traffic. The probe data used to detect traffic may be matched to road segments using the map matching value calculated by the embodiments above. In addition, subsequent probe data be matched d to road segments using the map matching parameter in order to issue traffic warnings to the mobile device 122. For example, colors and/or patterns are used to indicate traffic speed levels. In an embodiment, traffic speed is indicated using a plateaued threshold reporting scheme. For example, a series of traffic flow thresholds may be established such that a traffic speed value for a segment falls into a category defined by traffic speed threshold category boundaries. Each traffic speed threshold category may be indicated differently. For example, a segment having a high traffic speed category may be presented to a user differently than a segment having a low traffic speed category. Any indication that differentiates the different traffic flow levels may be used. In an embodiment, colors may be used for characterizations of traffic flow, and indicating the different traffic flow level comprises using different colors for a first segment and a second segment. Varying patterns or other indications may also be used to indicate different traffic levels for segments. In an embodiment, a congestion factor may be used to determine values for traffic level categories. For example, a heavy traffic category may have a congestion factor value between 0 and 10%. A moderately heavy traffic category may have a congestion factor value between 10% and 30%. A moderate traffic category may have a congestion factor between 30% and 80%, and a light or free flow traffic category may have a congestion factor between 80% and 100%. Any number of levels or categories may be provided.

Different indications of traffic information for various road segments may be provided to a mobile device 122. The mobile device 122 may be provided a visible representation of the traffic levels. Different graphics may be used for different traffic levels. For example, the segments or lengths of road having different traffic levels are presented in different colors, instead of a singular color for the entire length of road.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 800 may be a single device or combinations of devices, such as associated with a network, distributed processing, or cloud computing.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 801 may be removable from the mobile device 122, such as a secure digital (SD) memory card.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

The database 123 may include geographic data used for traffic and/or navigation-related applications. The geographic data may include data representing a road network or system including road segment data and node data. The road segment data represent roads, and the node data represent the ends or intersections of the roads. The road segment data and the node data indicate the location of the roads and intersections as well as various attributes of the roads and intersections. Other formats than road segments and nodes may be used for the geographic data. The geographic data may include structured cartographic data or pedestrian routes.

The database 123 may also include other attributes of or about the roads such as, for example, geographic coordinates, street names, address ranges, speed limits, turn restrictions at intersections, and/or other navigation related attributes (e.g., one or more of the road segments is part of a highway or toll way, the location of stop signs and/or stoplights along the road segments), as well as points of interest (POIs), such as gasoline stations, hotels, restaurants, museums, stadiums, offices, automobile dealerships, auto repair shops, buildings, stores, parks, etc. The database 123 may also contain one or more node data record(s) which may be associated with attributes (e.g., about the intersections) such as, for example, geographic coordinates, street names, address ranges, speed limits, turn restrictions at intersections, and other navigation related attributes, as well as POIs such as, for example, gasoline stations, hotels, restaurants, museums, stadiums, offices, automobile dealerships, auto repair shops, buildings, stores, parks, etc. The geographic data may additionally or alternatively include other data records such as, for example, POI data records, topographical data records, cartographic data records, routing data, and maneuver data.

The database 123 may include historical traffic speed data for one or more road segments. The database 123 may also include traffic attributes for one or more road segments. A traffic attribute may indicate that a road segment has a high probability of traffic congestion.

The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers. In an embodiment, the input device 203 may involve a device having velocity detecting abilities.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122.

The position circuitry 207 may also include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device.

The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry. In an embodiment, a vehicle may be considered a mobile device, or the mobile device may be integrated into a vehicle.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   identifying a map region including one or more road segments;
   selecting a plurality of points in the map region;
   measuring a plurality of distances, wherein each distance is a length from each of the plurality of points to a nearest road segment of the one or more road segments;
   calculating, using a processor, a road density value from the plurality of distances;
   calculating, using the processor, a map matching parameter from the road density value: and
   matching, using the processor, a road segment to at least one probe point from sensor data based on the map matching parameter, wherein the map matching parameter improves the accuracy of matching the road segment to the at least one probe point.

2. The method of claim 1, wherein the map matching parameter is a radius.

3. The method of claim 1, wherein calculating the road density value comprises:
   calculating an average of the plurality of distances from each of the plurality of points to the nearest road segment, wherein the road density value is an inverse of the average of the plurality of distances from each of the plurality of points to the nearest road segments.

4. The method of claim 1, wherein the one or more road segments is a plurality of road segments, and the road density value is indicative of a relative distance between the plurality of road segments.

5. The method of claim 1, further comprising:
   receiving a first description of a first collected set of probe data;
   receiving a second description of a second collected set of probe data; and
   performing a comparison of the first description and the second description, at least in part, based on the road density value.

6. The method of claim 5, further comprising:
   selecting the first collected set of probe data based on the comparison.

7. The method of claim 1, further comprising:
   calculating a navigation command or a driving command based on the map matching algorithm; and
   sending the navigation command or the driving command to a mobile device.

8. An apparatus comprising:
   at least one processor; and
   at least one memory including computer program code, the at least one memory and the computer program code configured to, with the at least one processor, cause the apparatus at least to:
   identify a map region including one or more road segments;
   select a plurality of points in the map region;
   measure a plurality of distances, wherein each distance is a length from each of the plurality of points to a nearest road segment of the one or more road segments;
   calculate a road density value from the plurality of distances;
   calculate a map matching parameter from the road density value;
   receive at least one probe point:
   apply a map matching algorithm using the map matching parameter, and
   identify a road segment from the map matching algorithm, wherein the map matching parameter improves the accuracy of identifying the road segment for the at least one probe point.

9. The apparatus of claim 8, wherein the road density value is an inverse of the average length from each of the plurality of points to the respective nearest road segment.

10. The apparatus of claim 8, the road density value is an inverse of an average of the plurality of distances from each of the plurality of points to the nearest road segment.

11. The apparatus of claim 8, wherein the one or more road segments is a plurality of road segments, and the road density value is indicative of a relative distance between the plurality of road segments.

12. The apparatus of claim 8, the at least one memory and the computer program code configured to, with the at least one processor, cause the apparatus at least to:
   receive a first description of a first collected set of probe data;
   receive a second description of a second collected set of probe data; and
   perform a comparison of the first description and the second description, at least in part, based on the road density value.

13. The apparatus of claim 12, the at least one memory and the computer program code configured to, with the at least one processor, cause the apparatus at least to:
   receive current probe data from a vehicle;
   apply the map matching algorithm to the current probe data using the map matching value; and
   determine a navigation command or a driving command for the vehicle based on the map matching algorithm.

14. A non-transitory computer readable medium including instructions that when executed are operable to:
   receive at least one probe point collected by a mobile device in a geographical area corresponding to a map region;
   apply a map matching algorithm using a map matching parameter, wherein the map matching parameter is proportional to an inverse of an average of distances from a plurality of randomly selected location points in the map region to a nearest road segment;

identify a matched road segment from the map matching algorithm, wherein the map matching parameter improves the accuracy of the matched road segment; and generate a navigation command or a driving command based on the matched road segment.

15. The non-transitory computer readable medium of claim 14, the instructions when executed operable to:

identify the map region including one or more road segments;

select the plurality of randomly selected location points in the map region based on a characteristic of the map region.

16. The non-transitory computer readable medium of claim 14, wherein the map matching parameter is a threshold radius for the map matching algorithm.

* * * * *